May 25, 1937. A. HULLEY 2,081,815
DOOR ARRANGEMENT FOR VEHICLES
Filed Feb. 10, 1937 3 Sheets-Sheet 1
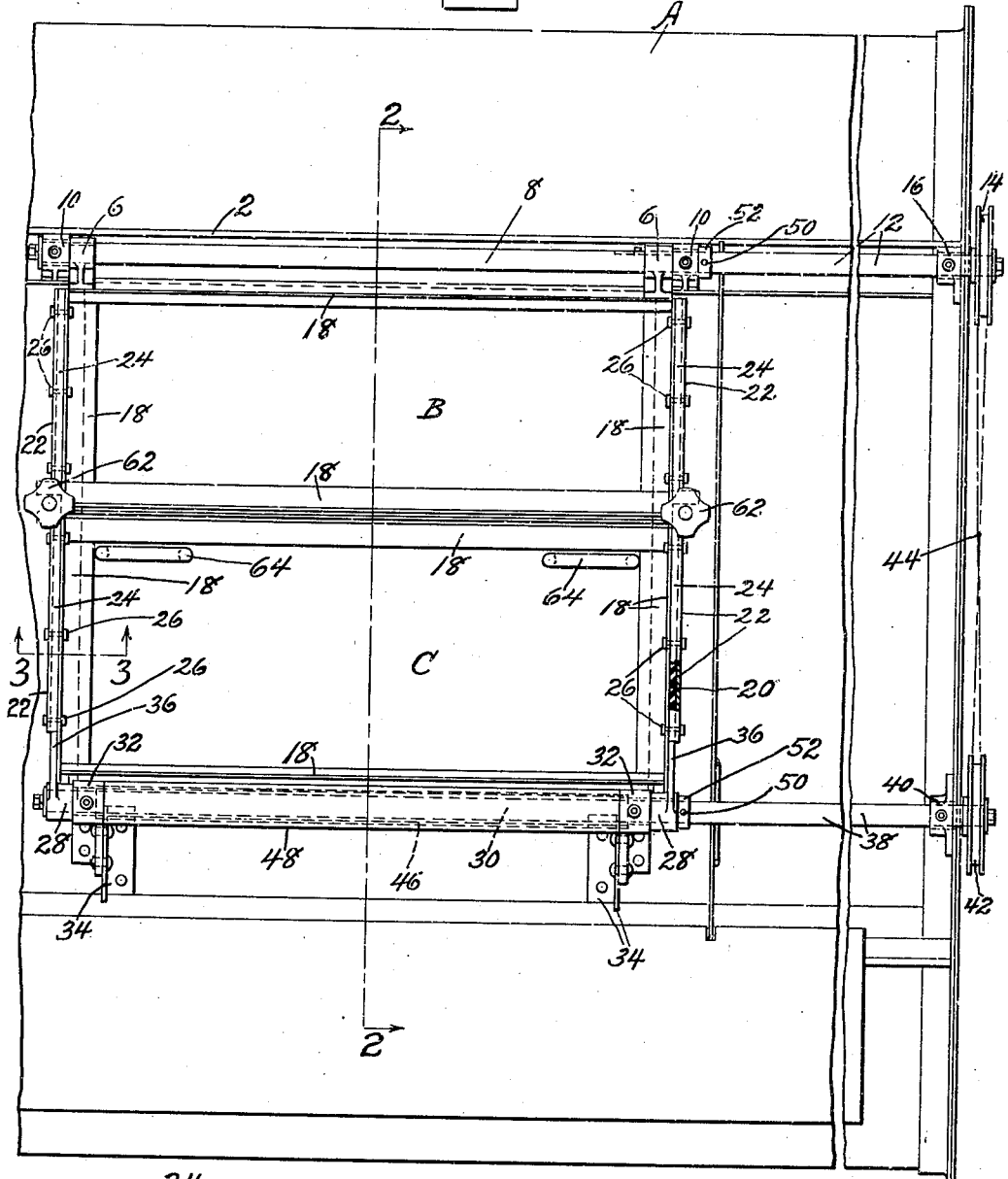
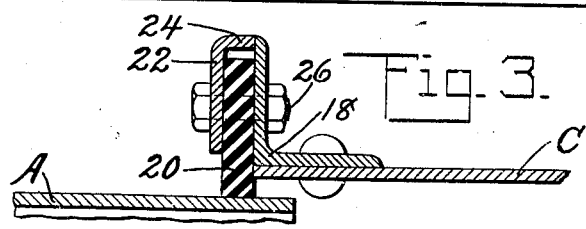
INVENTOR
Albert Hulley
BY
Donald U. Rich
ATTORNEY

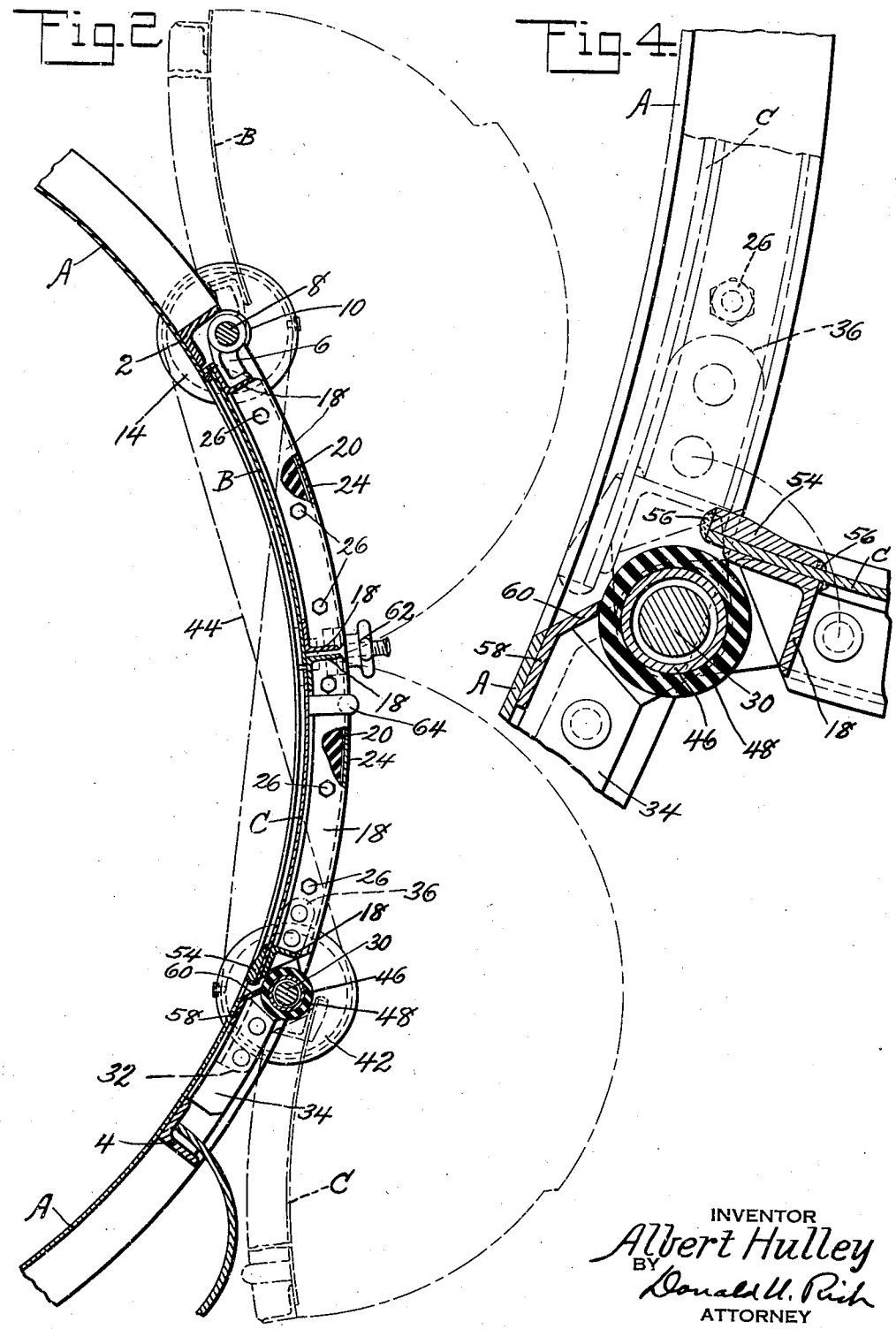

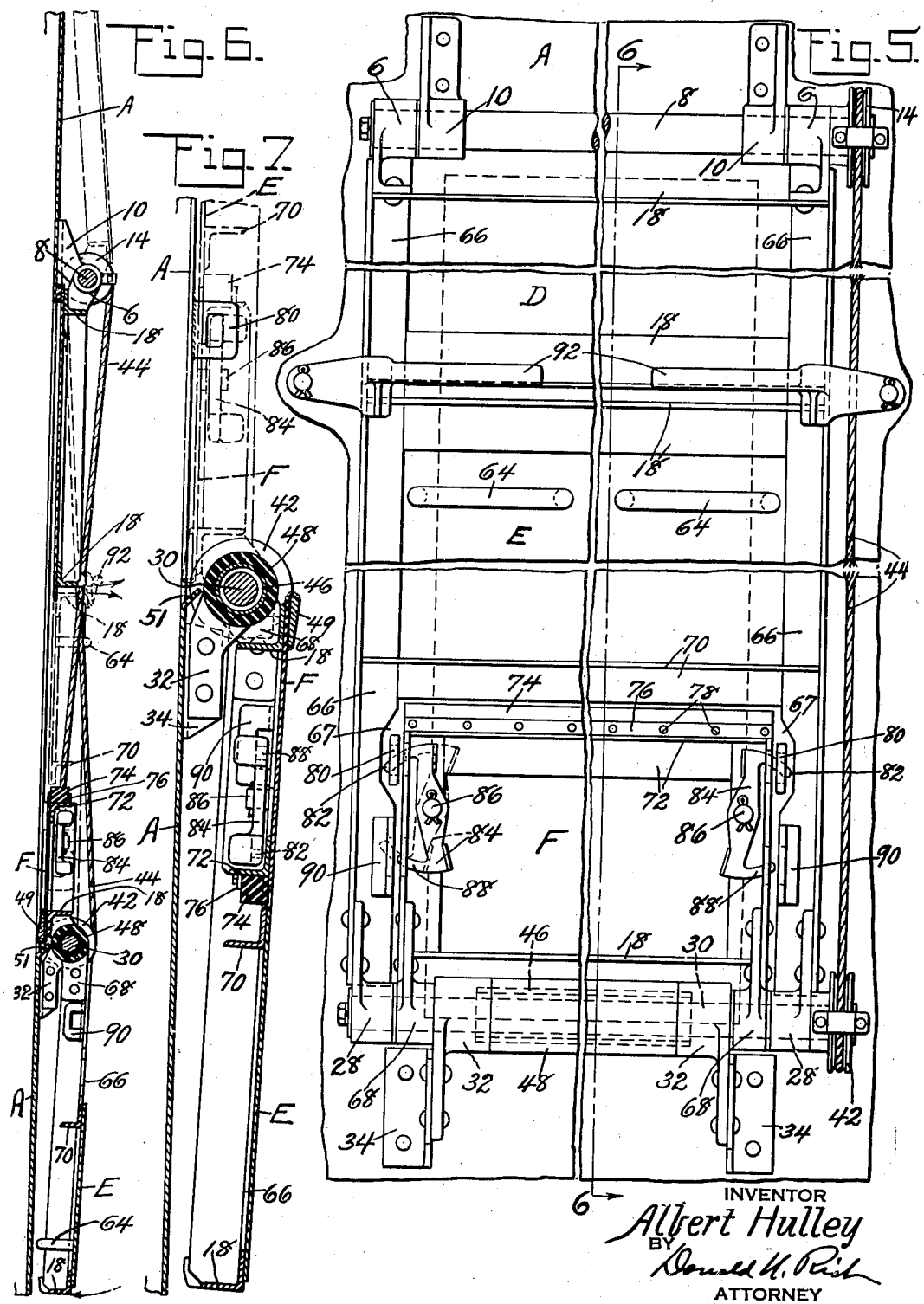

Patented May 25, 1937

2,081,815

UNITED STATES PATENT OFFICE 2,081,815

DOOR ARRANGEMENT FOR VEHICLES

Albert Hulley, New York, N. Y.

Application February 10, 1937, Serial No. 125,106

14 Claims. (Cl. 296—101)

This invention relates to new and improved door construction, and has particular reference to doors for vehicles or other storage or transportation structures and operating means therefor.

One object of this invention is the provision of a door construction and means for effecting simultaneous opening and closing movement thereof.

Another object of the invention is the provision of a new and improved door construction for vehicles adapted for the transportation of refuse, in which a door frame member is provided including resilient or shock absorbing material.

A further object of the invention is the provision of a door arrangement for vehicles, said arrangement including oppositely acting doors, together with a resilient rest element for receptacles being dumped, adjacent one of said doors, said door having means thereon so formed and arranged as to remove any matter deposited on the rest element and force said matter into the vehicle upon movement of the door to closed position.

Other objects and advantages of this invention will be fully apparent to those skilled in the art from the following description taken in conjunction with the accompanying drawings, in which:

Figure 1 is a side elevation of a portion of a vehicle body having the present invention applied thereto.

Fig. 2 is a sectional view taken on the line 2—2, Fig. 1.

Fig. 3 is an enlarged sectional view taken on the line 3—3, Fig. 1.

Fig. 4 is an enlarged detail sectional view taken at the hinge portion of the lower door, the latter being shown in closed position in broken lines.

Fig. 5 is a broken side elevation of a portion of a vehicle body, showing a modified form of door construction.

Fig. 6 is a sectional view on the line 6—6, Fig. 5, showing one portion of the lower door in full lines in open position, and in broken lines in closed position; and Fig. 7 is an enlarged detail sectional view of the modification shown in Fig. 5, with the lower two part door shown in open position in full lines and in closed position in broken lines.

Referring now more particularly to the drawings, and specifically to the construction shown in Figs. 1 to 4 inclusive, a portion of the body of a vehicle is shown at A; in the instance shown, the vehicle is one of the refuse carrying type having a substantially cylindrical body. The cylindrical shape is, of course, merely by way of example.

Body A is provided with a filling opening framed at the upper portion by an angle 2 and at its lower portion by an angle 4. The filling opening is normally closed by upper and lower doors B and C, respectively; door B being secured at brackets 6 to a rock shaft or hinge rod 8 horizontally supported above but adjacent the upper edge portion of door B in bearings 10 secured to body A at frame angle 2. Rock shaft 8 is extended as at 12 and has a pulley 14 secured to the end portion thereof. As shown in the drawings, the projection 12 extends to one end of body A, and through a bearing 16 but obviously this is illustrative only as the pulley may, if desired, be arranged immediately adjacent the door opening, as shown in Fig. 5.

The upper, lower and side edge portions of door B are stiffened by angles 18, and, as shown in Fig. 3, sealing elements such as rubber strips 20 are connected with the side edge angles 18 by retainers 22, flanged as at 24 and secured to angles 18 by fasteners such as bolts 26. Obviously side edge angles 18 and retainers 22 may be formed as integral units if desired.

Door B, as will be apparent, is movable upwardly in an arc to open position; while door C, as clearly shown is secured by bushings 28 to a rock shaft 30 supported adjacent the lower edge portion of door C in bearings 32 carried by brackets 34 secured to the body A. The bushings 28 are preferably provided with lugs or ears 36 by which they are secured to door C. The upper, lower, and side edge portions of door C are preferably stiffened in the same manner as door B and hence the same reference characters are applied. Rock shaft 30 extends similar to shaft 8, as shown at 38, through a bearing 40 and carries a pulley 42 at its end portion. A crossed operating cable 44 engages pulleys 14 and 42 whereby doors B and C will be substantially simultaneously operated to open or closed position. The doors B and C are substantially the same in size and weight so that a balanced construction is provided, and, as shown clearly in Fig. 2, the lower edge portion of door B laps the upper edge angle 18 of door C to provide a sealing closure.

As clearly shown in Figs. 1, 2 and 4, rock shaft 30 is arranged within a metallic sleeve 46 to which is secured a resilient support 48, of rubber or the like, which extends between bearings 32. Secured to shafts 8 and 30 by fasteners 50 are end thrust collars 52, for an obvious purpose.

The lower edge portion of door C is provided with a plate 54, welded as at 56, or otherwise suitably secured to the inner surface of the door and constituting a pusher element for forcing any matter deposited on support 48 into the body A; a shedder plate 58 being secured to the outer surface of body A and having an outwardly directed flange 60, the free edge portion of which is arranged substantially in engagement with the support 48, as shown clearly in Figs. 2 and 4.

Secured to body A adjacent the contiguous edge portions of doors B and C, are door locks 62, while door C is provided with operating handles 64.

Figs. 5, 6 and 7 show a modified form of the invention in which the upper door, indicated at D, is similar to door B of Fig. 1, and hence the same reference characters are applied. The closure for the lower portion of the door opening comprises a two-part construction including a main door section E and a supplemental door section F.

As shown clearly in Fig. 5, the upper door D is considerably smaller than the two-part construction formed of door sections E and F. As is also shown in Fig. 5, the lower portion of door E is provided with an opening for door section F, said opening being formed to provide spaced legs 66 by which said section is secured to rock shaft 30.

Door section F normally closes the opening formed in section E and is provided with lower bearings 68 by which it is hingedly connected to rock shaft 30. Rock shaft 30 is provided with a sleeve 46 and resilient support 48 in the manner shown in Figs. 2 and 4, and the same reference characters are applied. Door section F may be, and preferably is, provided with a pusher element 49, similar to element 54 shown in Figs. 2 and 4, and the body A, at the opening for door section F, has an inturned flange 51 constituting a shedder similar to shedder plate 58. If desired, an element similar to plate 58 may be applied instead of flanging the body A.

Secured to door section E at the opening formed therein is an angle 70, while the upper edge portion of door section F is provided with an angle 72, supporting a rubber strip 74 held by a retainer 76 and fasteners 78. As shown, the rubber 74 is arranged immediately adjacent angle 70 to provide a closure between door sections E and F.

Secured to body A on opposite sides of door section E, the legs 66 being cut away at 67 to provide clearance, are keepers 80 with which upper hook portions 82 of locks 84, carried by door section F, are engaged to secure said door section against movement when door section E is moved to open position. The locks 84 are pivoted substantially midway between their ends as at 86, and the lower end portions are provided with hooks 88 or the like adapted to be engaged with keepers 90 secured to legs 66 of door section E whereby sections E and F may move together.

Door D and the two-part lower door formed of sections E and F may be secured together by door locks 92 of any suitable or desired type.

In the construction shown in Figs. 1 to 4 inclusive, the locks 62 are released, whereupon movement of door C to open position will, because of cable 44, cause rocking of shaft 8 to move door B to open position. With door C in open position, as shown in broken lines, Fig. 2, the vehicle body may be loaded. Refuse is usually handled in metal cans, and rubber 48 provides a resilient shock absorbing element to prevent injury thereto. During closing movement of the doors, element 54 will force any material resting on rubber 48 into the vehicle body as will be apparent.

In the construction shown in Figs. 5, 6 and 7, with latches 84 engaged with keepers 80, the door section E may be moved to open position, thus permitting matter to be deposited into the body above door section F, rubber cushion 74 acting as a shock absorbing rest for the receptacles being emptied.

With latches 84 engaged with keepers 90, door section F is connected to door section E for movement to and from closed position therewith.

The description and drawings relate more specifically to the application of the door construction as applied to a vehicle but obviously this is merely by way of example as the door construction may be applied to any receptacle adapted for storage or transportation of any material, therefore, while the drawings illustrate certain embodiments of the invention it is to be understood that various changes in the form and proportions may be made within the scope of the appended claims without departing from the spirit of the invention.

What is claimed is:

1. In a vehicle, a body having a filling opening, a pair of hingedly mounted door members normally closing said opening, means connecting said doors so arranged as to effect opposed opening and closing movements in unison, and a cushion element at the lower portion of the filling opening constituting a shock absorbing element for receptacles being emptied through the opening.

2. In a vehicle, a body having a filling opening, upper and lower door members hingedly connected with the body and normally closing said opening, said lower door element being so arranged as to swing downwardly to open position, means on the lower door member adjacent the hinge therefor constituting a wiper element adapted to force material into the body during closing movement of the lower door member, and means connecting said door members so arranged as to effect opposed opening and closing movements of the doors in unison.

3. In a vehicle, a body having a filling opening, a door member for said opening, said door member being hinged to the body for opening movement in a downward direction, and a cushioning element at the hinge constituting a resilient support for receptacles being emptied into the body.

4. In a vehicle, a body provided with a filling opening, a door member for the opening and hingedly connected to the body for opening movement in a downward direction, a cushioning element at the hinge for providing a shock absorber for receptacles being emptied into the body, a shedder member secured to the body and bridging the space between the body and the cushioning element, and means on said door member so formed and arranged as to force material on the cushioning element onto the shedder member and into the body during closing movement of said door member.

5. In a vehicle, a body provided with a filling opening, a door member for the opening, a rock shaft to which the door member is secured for opening movement in a downward direction, resilient means secured to the side edge portions of the door member formed to sealingly engage the body when the door member is in closed position, a cushioning element at the rock shaft constituting a resilient support for receptacles being emptied into the body, and means on the door member adjacent the cushioning element for forcing material deposited on said cushioning element into the body during movement of the door member to closed position.

6. Means for closing the filling opening of a vehicle body comprising a two-part door element embodying an auxiliary door section, a main door section having side portions straddling the auxiliary door section, a rock shaft pivotally supporting the auxiliary door section and to which the main door section is fixedly connected, and latch elements pivoted to the auxiliary door section adapted to be engaged with the vehicle body or the main door section whereby when engaged with the body the main door section may be moved to open or closed position independently of the auxiliary section and when connected with said main door section said door sections move as a unit.

7. Means for closing the filling opening of a vehicle body comprising a two-part door member including an auxiliary door section, a main door section straddling said auxiliary door section, a rock shaft to which the door sections are connected, and means fastening the auxiliary door section to the car body whereby said main door section may be moved to open or closed position independently of said auxiliary door section.

8. Means for closing the filling opening of a vehicle body comprising a door formed of a main door section and an auxiliary door section, a rock shaft to which the door sections are secured, cushioning elements arranged at the upper portion of the auxiliary door section and at the rock shaft respectively, and means connecting the door sections for movement in unison, said means being releasable to permit opening and closing movements of the main door section independently of the auxiliary door section.

9. A hinge arrangement for doors comprising a rock shaft to which the door is fixedly secured, a sleeve surrounding the rock shaft, and a cushioning element surrounding the sleeve.

10. Means for closing the filling opening of a vehicle body comprising a door element, a rock shaft at the lower portion of the opening with which the door element is connected, a sleeve surrounding the rock shaft, a cushioning element secured to the sleeve and constituting a resilient support for receptacles being emptied into the body, and pusher means secured to the door element adjacent the cushioning element and adapted to force material from said cushioning element into the body during closing movement of the door element.

11. In a vehicle, a body having a filling opening, a door member for said opening, said door member being hinged to the body for opening movement in an outward and downward direction, and a cushioning element at the hinge constituting a resilient support for receptacles being emptied into the body.

12. In a storage or transportation container having a filling opening, a pair of hingedly mounted doors normally closing said opening, means connecting said doors so arranged as to effect opposed opening and closing movement in unison, locking means secured to the container adjacent the contiguous edge portions of the doors and a cushioning element at the lower portion of the filling opening constituting a shock absorbing medium for receptacles being emptied through the opening.

13. In a container having a filling opening, a door for said opening, hinge means at the lower portion of the door opening to which the door is secured, and a wiper element at the lower portion of the door opening cooperatively associated with the door to be shifted by the latter adjacent the hinge to force material into the container upon movement of the door to closed position.

14. In a container having a filling opening, a door for said opening hingedly secured adjacent the lower portion of said opening, a cushioning element at the hinge constituting a sound deadening medium for receptacles being emptied into said container, and a wiper element shiftably supported at the lower portion of the door opening and cooperatively associated with the door adjacent the hinge in such a manner as to be shifted to remove material from the cushioning element and force it into the container during movement of the door to closed position.

ALBERT HULLEY.